Patented May 14, 1946

2,400,474

UNITED STATES PATENT OFFICE 2,400,474

ADHESIVES COMPRISING AN OLEFIN POLY-SULPHIDE RUBBER

Theodore R. Ten Broeck, Cuyahoga Falls, Ohio, assignor to Wingfoot Corporation, Akron, Ohio, a corporation of Delaware No Drawing. Application November 3, 1942, Serial No. 464,396

2 Claims. (Cl. 260—79)

This invention relates to adhesives, and more particularly to uniting materials through an adhesive bond comprising a particular type of synthetic rubber and an organic diisocyanate.

One of the well-recognized and commercially developed synthetic rubbers is the olefin polysulphide type sold under the name of "Thiokol" by the Thiokol Corporation. There are a number of possible variations in the manufacture of this type of synthetic and in the product, but the fundamental type reaction may be illustrated by the interaction of ethylene dichloride and sodium polysulphide to form what is regarded as a high molecular weight straight chain polymer. However, the reaction is not limited to these specific materials, and the olefin polysulphide rubbers are sometimes more generally referred to as the reaction products of alkylene dihalides and alkali metal polysulphides. Also, as a particular variant, the alkylene chain may be interrupted, for example, by oxygen. Thus, dichlor diethyl ether may be used instead of ethylene dichloride. Other modifications are also possible. This chain type of polymer, which will be referred to hereinafter as an olefin polysulphide rubber, is well recognized in the art.

The olefin polysulphide rubbers are used for many purposes analogous to those for which natural rubber is employed. In many of these uses the adhesive properties of the olefin polysulphide rubber become important. For example, this is an important factor when the material is dissolved in an organic solvent and used as an adhesive or when solid olefin polysulphide rubber is to be united to itself or other material in the fabrication of an article such as a tire or gasket. According to the present invention, a material having superior adhesive properties is produced by using with the olefin polysulphide rubber an organic diisocyanate.

Any organic diisocyanate, either aliphatic or aromatic, may be used. The preferred diisocyanate is methylene di(paraphenylene isocyanate) Further representative examples are paraphenylene diisocyanate, methaphenylene diisocyanate, the diphenylene diisocyanates, the toluylene diisocyanates, the dimethyl phenylene diisocyanates, the naphthylene diisocyanates, hexamethylene diisocyanate, the diisocyanates of dioxane, ethylene di(oxytrimethylene isocyanate) and the diisocyanates of other glycol ethers, the diisocyanates of dipropyl ethers, etc. These and other diisocyanates may be prepared by various methods, as by passing hydrogen chloride through a solution of the diamine in an organic solvent and then passing phosgene into the suspension formed by stirring the precipitate of the amine hydrochloride in the solvent, then heating to the reflux temperature of the solvent.

The adhesive compounds of this invention may be applied in all of the usual ways in which such compounds are ordinarily applied. They may be used to secure various materials to themselves or to each other, including rubber, synthetic rubbers, paper, various textiles, cork, Holland fabric, cotton, regenerated cellulose such as rayon and Cellophane, cellulose derivatives (such as the acetate, nitrate, acetobutyrate, etc.), glass, metals (including steel, brass, copper, aluminum, tin, etc.), rubber hydrochloride, high molecular linear polyamides such as nylon (manufactured by E. I. du Pont de Nemours and Company), and various polymeric materials such as polyvinyl alcohol, polyvinyl acetate, polyvinyl chloride, co-polymers of vinyl chloride and vinylidene chloride, co-polymers of vinyl chloride and vinyl acetate, and other polymers and co-polymers.

The adhesives have been found to be particularly effective in uniting cotton and rayon cords and fabrics to rubber, olefin polysulphide rubber, and other synthetic rubbers in the manufacture of belts and pneumatic tires and similar products, since they form a strong bond which stands up well under the severe conditions of use encountered with such products.

The amount of diisocyanate which should be added to the adhesive will vary with the choice of diisocyanate, the nature of the adhesive, the material to which it is applied and the manner in which it is applied. For example, in using methylene di(paraphenylene isocyanate), it will be found that even 0.02% added to a cement containing from 3 to 4% of olefin polysulphide rubber in an organic solvent will appreciably increase the adhesive properties of the cement. Somewhat greater quantities of other diisocyanates, such as hexamethylene diisocyanate, are required to show an equivalent improvement. Generally the amount of diisocyanate used will not be more than several percent up to about 5% of the weight of the total adhesive solids employed, although on occasion as much as 20% or even greater amounts may be used.

If desired, various additional modifying agents may also be added to the adhesives, such as resins, plasticizers, diluents, fillers, carbon black, and other reinforcing agents, vulcanizing agents, accelerators, age resisters, etc.

The adhesives may be used in a two step process or the olefin polysulphide rubber and diisocyanate may be mixed and applied in a single operation. Thus, in bonding rubber (including synthetic rubbers) to a reinforcing cord structure, the cords may be dipped in a solution of diisocyanate, partially freed of solvent, then dipped into a solution or dispersion of the olefin polysulphide rubber, further freed from liquid, and then laminated with a conventional "rubber" stock and cured. Or, if desired, the cords may be coated with a cement containing both the olefin polysulphide rubber and the diisocyanate, then dried, laminated with "rubber" stock and cured. In factory operations, either the two step or one step process may generally be used with equal facility although the one step process often results in less equipment and handling. When the diisocyanate is premixed with the olefin polysulphide rubber cement and particularly when the cement used has a high voscosity, there is a tendency for the cement to cure or set up on standing and, consequently, if the diisocyanate is to be mixed with the cement, it is desirable that this mixing take place only a short time before use of the cement, so that it may be applied before the setting-up action takes place.

In using the adhesives, heat may be applied to dry or set them, but they may also be used at room temperature.

What I claim is:

1. An adhesive which comprises an olefin polysulphide rubber and an organic diisocyanate, said olefin polysulphide rubber being the reaction product of an alkylene dihalide and an alkali metal polysulphide.

2. An adhesive which comprises an olefin polysulphide rubber and methylene di(para-phenylene isocyanate), said olefin polysulphide rubber being the reaction product of an alkylene dihalide and an alkali metal polysulphide.

THEODORE R. TEN BROECK.